United States Patent [19]

Wada et al.

[11] 4,055,438

[45] Oct. 25, 1977

[54] BARIUM TITANATE CERAMIC

[75] Inventors: Shigetaka Wada, Kuwana; Senji Atsumi, Nagoya, both of Japan

[73] Assignee: NGK Insulators, Ltd., Nagoya, Japan

[21] Appl. No.: 594,967

[22] Filed: July 11, 1975

Related U.S. Application Data

[63] Continuation of Ser. No. 431,397, Jan. 7, 1974, abandoned, which is a continuation-in-part of Ser. No. 256,368, May 24, 1972, abandoned.

[30] Foreign Application Priority Data

June 2, 1971 Japan .................................. 46-37858

[51] Int. Cl.$^2$ ....................... C04B 35/00; C04B 35/46
[52] U.S. Cl. ............................. 106/73.32; 106/73.31; 252/63.5; 252/520
[58] Field of Search ...................... 106/73.32, 73.31; 252/520, 63.2, 63.5

[56] References Cited

U.S. PATENT DOCUMENTS

| 2,836,501 | 5/1958 | Crownover | 106/73.32 X |
|---|---|---|---|
| 2,934,442 | 4/1960 | Herbert | 106/73.31 |
| 3,373,120 | 3/1968 | Nitta et al. | 106/73.32 |
| 3,472,776 | 10/1969 | Derbyshire | 106/73.31 X |
| 3,473,958 | 10/1969 | Waku | 106/73.31 X |
| 3,474,043 | 10/1969 | Andersen et al. | 106/73.32 X |
| 3,586,642 | 6/1971 | Matsua et al. | 106/73.32 X |
| 3,666,505 | 5/1972 | Hoffman et al. | 106/73.32 X |
| 3,673,119 | 6/1972 | Ueoka et al. | 106/73.32 X |

OTHER PUBLICATIONS

Handbook of Chemistry and Physics (42nd Ed.) 1961, p. 3119.

*Primary Examiner*—Winston A. Douglas
*Assistant Examiner*—John F. Niebling

[57] ABSTRACT

A ceramic is disclosed which maintains a high electric resistance over a wide temperature range and has a large temperature coefficient of resistance variation at temperatures just below the aforesaid range, the PTC ceramic consisting essentially of 100 parts by weight of four ingredients including
   a. 1 mol of barium titanate composition,
   b. 0.003 to 0.05 mol of titania,
   c. 0.003 to 0.05 mol of alumina, and
   d. 0.005 to 0.06 mol of silica;
0.05 to 0.3 part by weight of
   e. tantalum pentoxide and/or antimony pentoxide; and
0.005 to 0.03 part by weight of
   f. manganese and/or copper.

12 Claims, 6 Drawing Figures

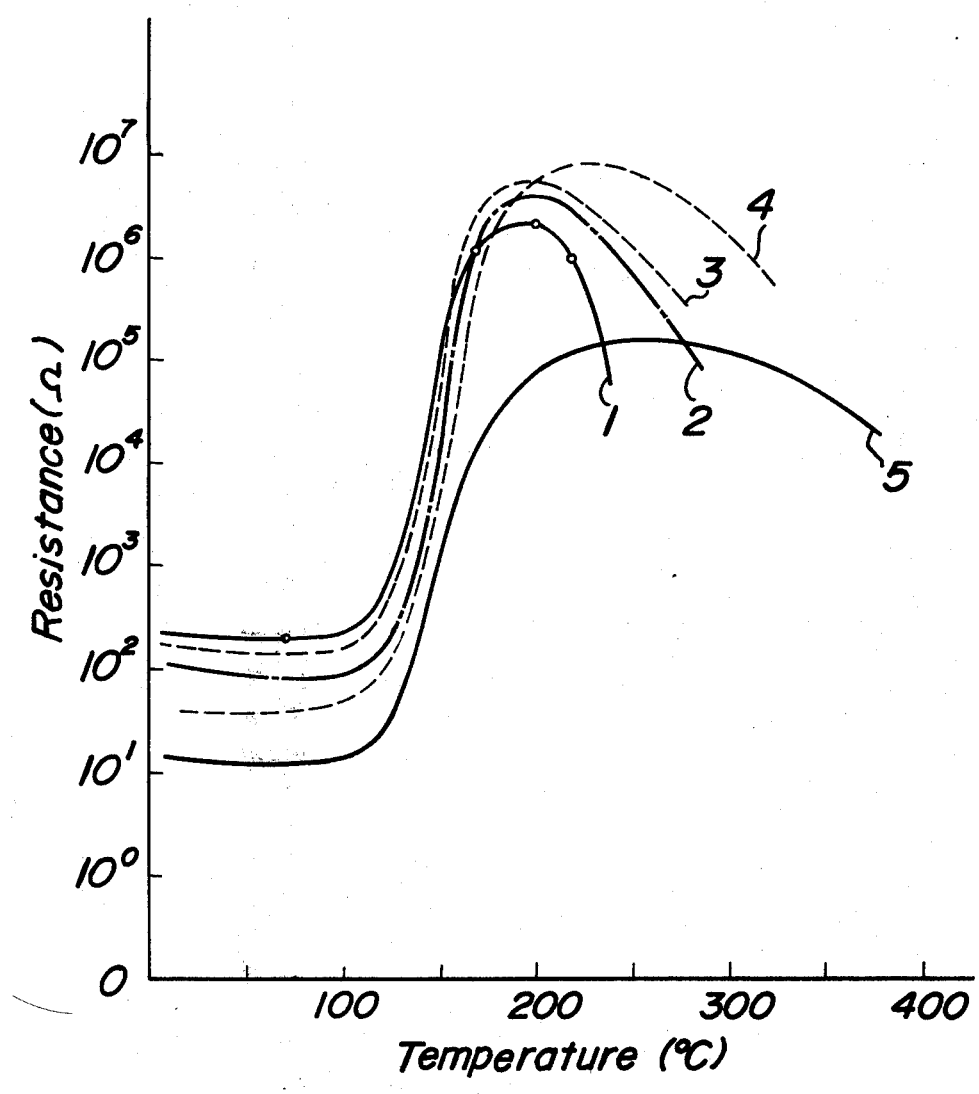
FIG_1

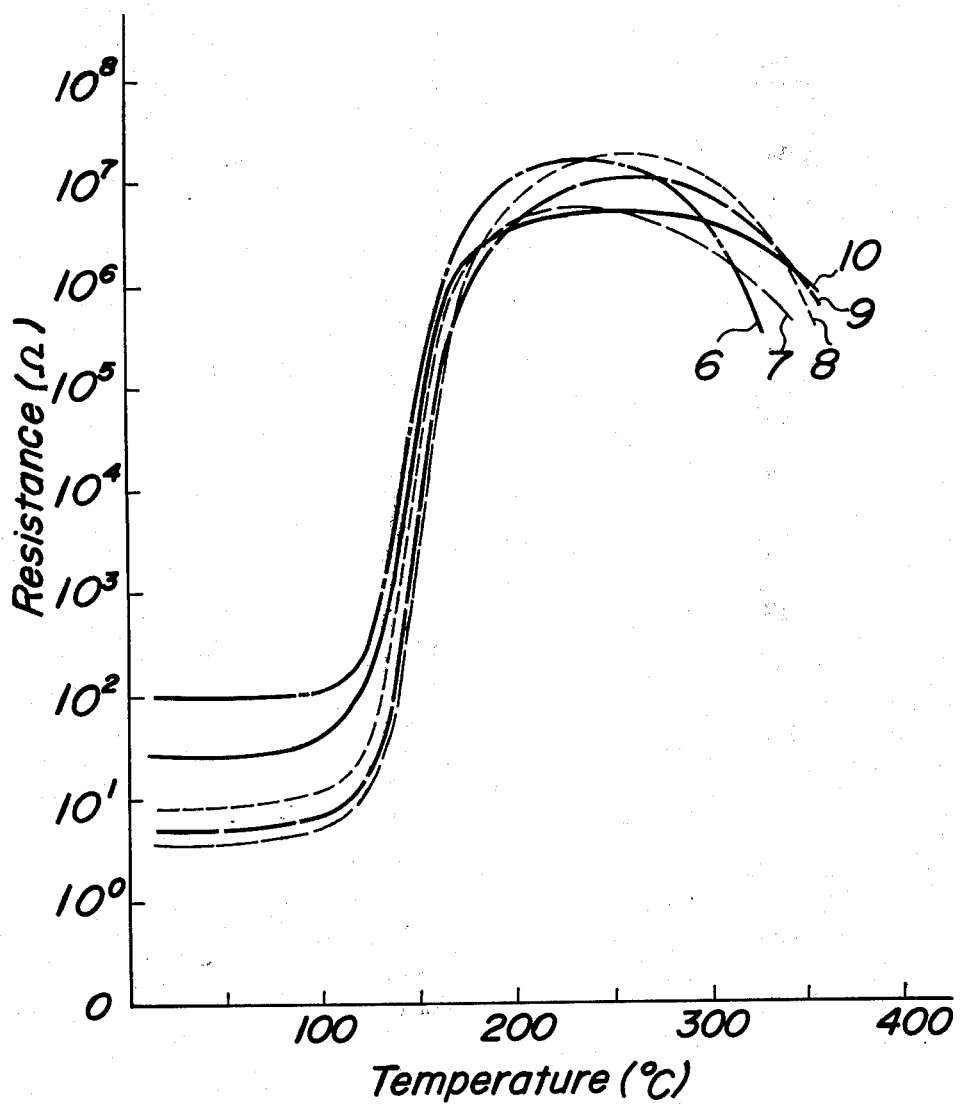
FIG_2A

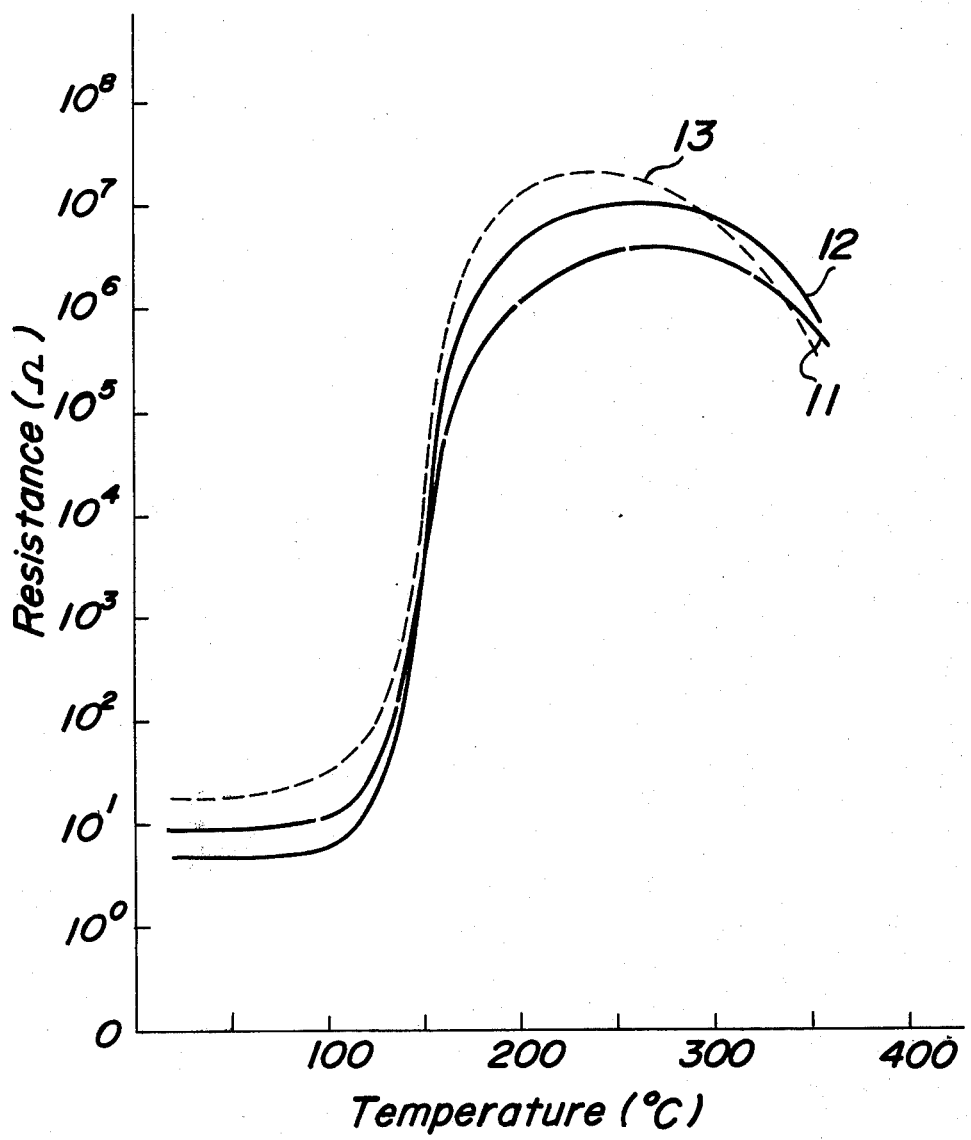
FIG_2B

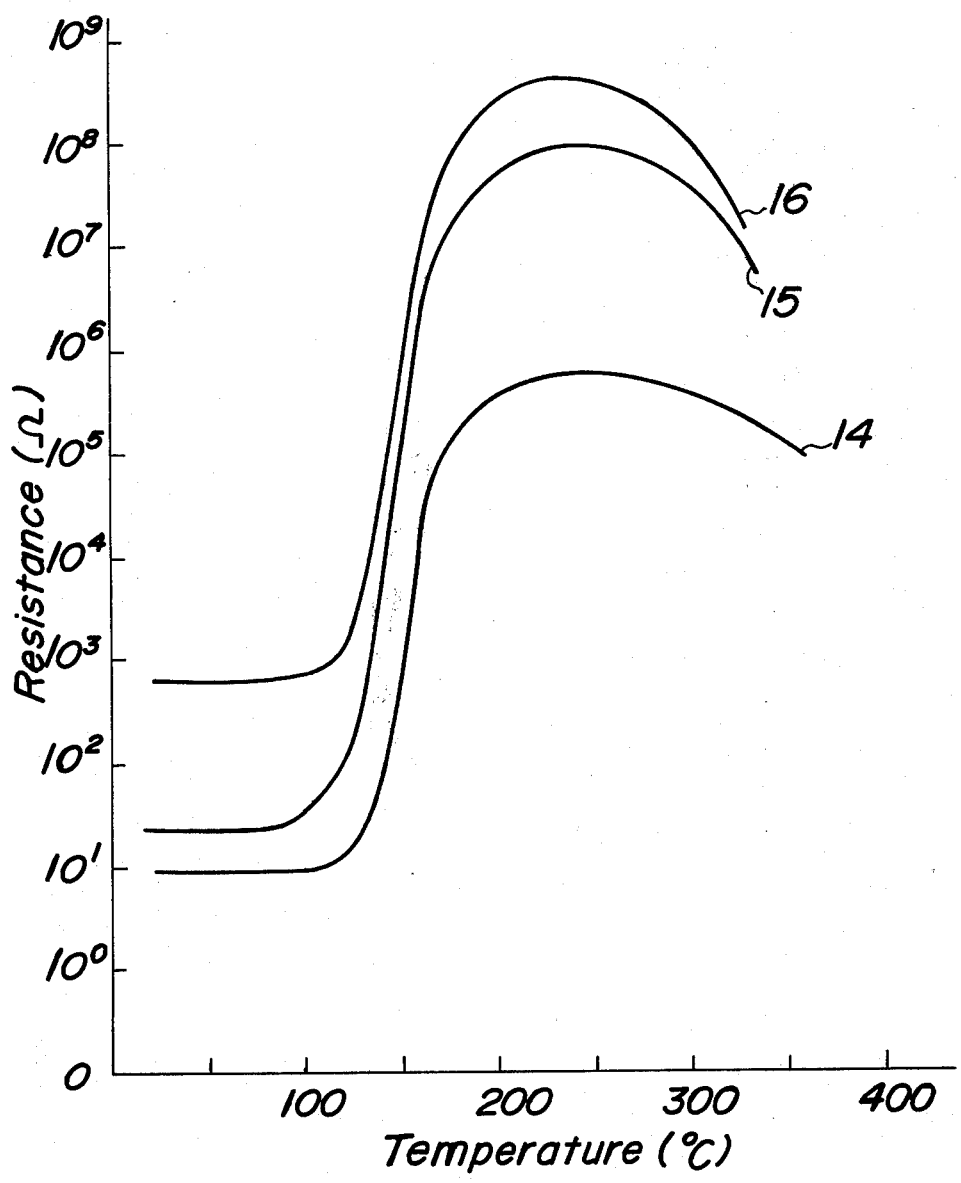

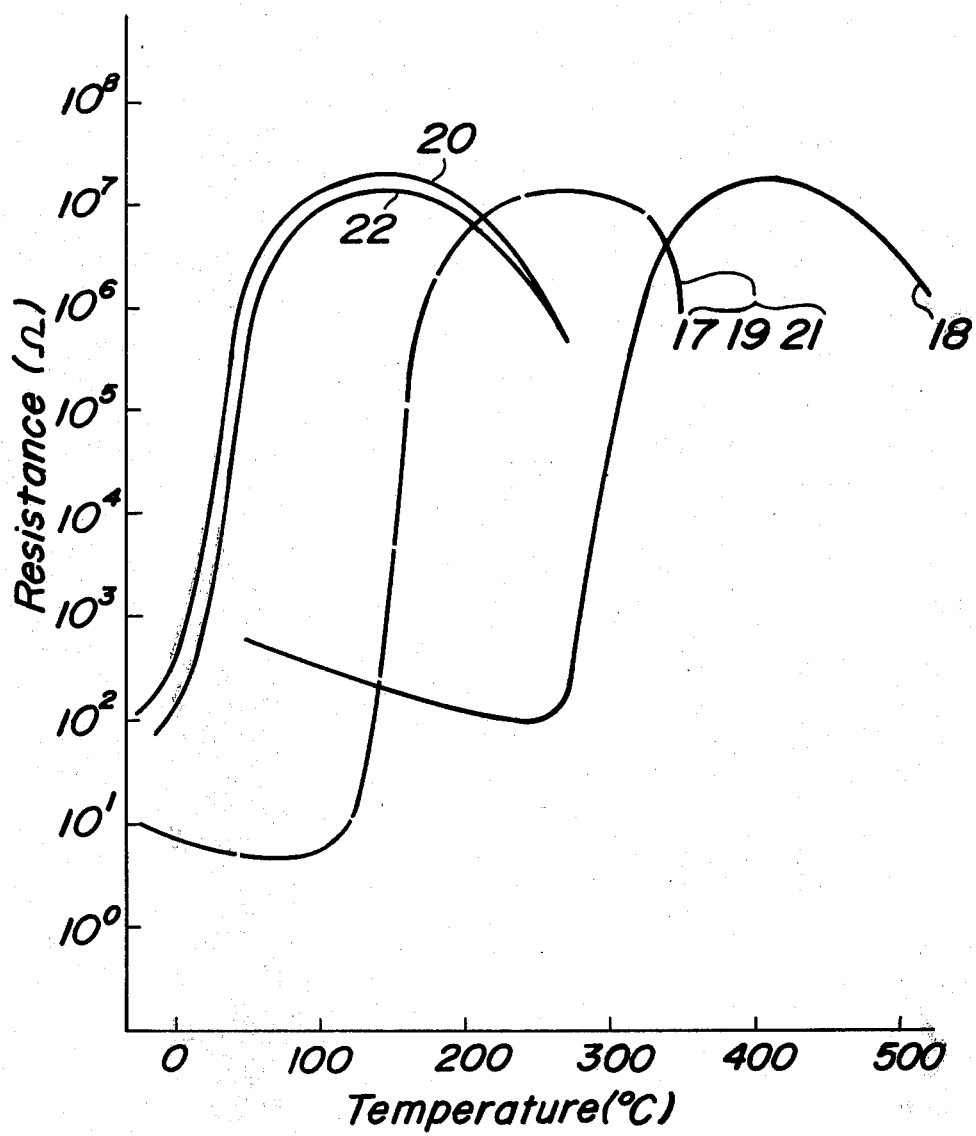
FIG_3

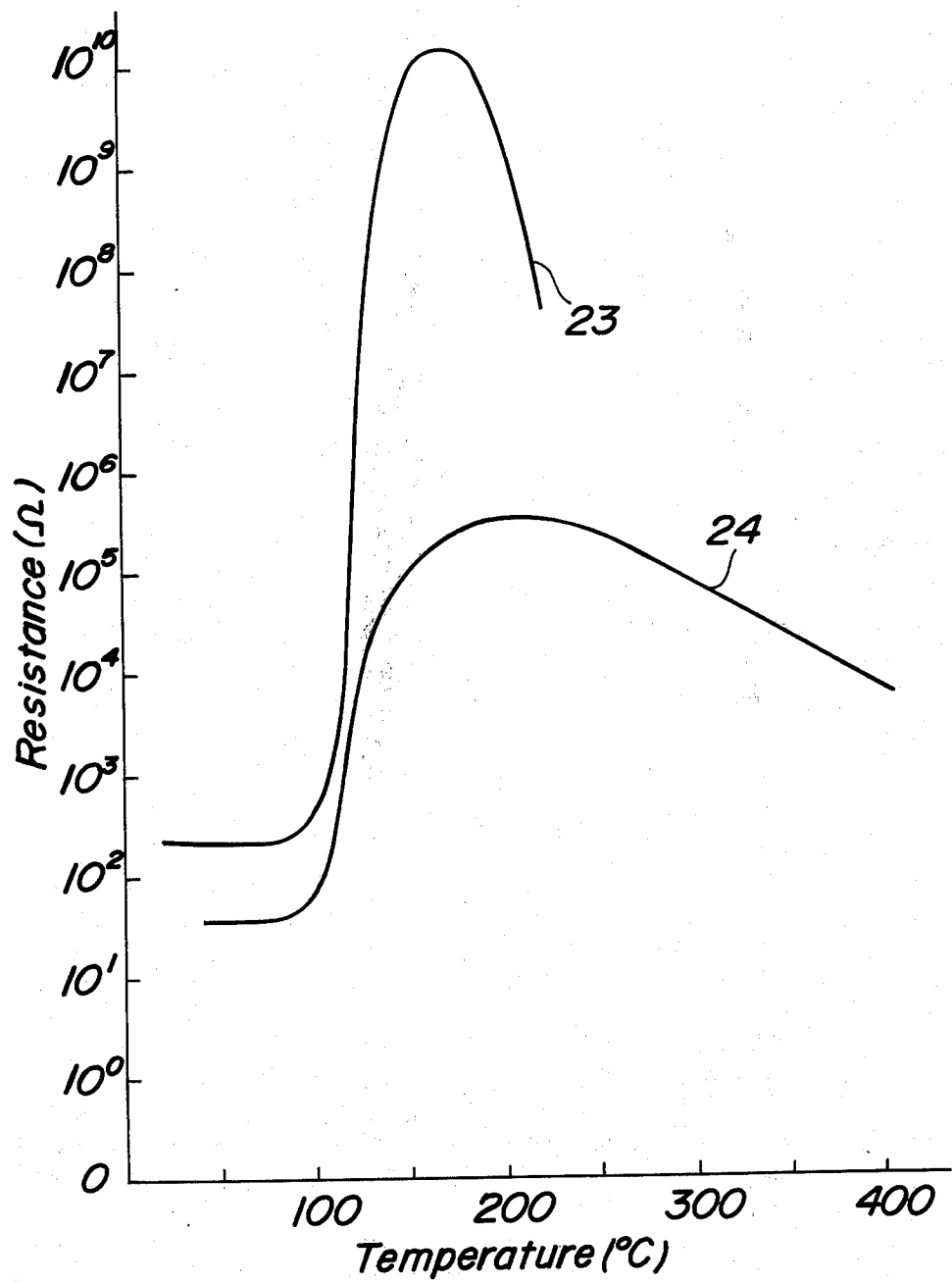
FIG_4
PRIOR ART

BARIUM TITANATE CERAMIC

CROSS-REFERENCE TO RELATED APPLICATION

This is a continuation of application Ser. No. 431,397 filed Jan. 7, 1974, now abandoned, which is a continuation-in-part of U.S. application No. 256,368 filed May 24, 1972, abandoned.

BACKGROUND OF THE INVENTION

1. Field of the Invention

This invention relates to a barium titanate ceramic having a positive temperature coefficient of electric resistance (to be referred to as "PTC ceramic"), and more particularly to a ceramic which maintains a high electric resistance over a wide temperature range and a high temperature coefficient of electric resistance at temperatures just below the aforesaid range.

2. Description of the Prior Art

When a PTC ceramic is used for temperature sensing and electric current limiting, inclusive of current interruption, it is required to simultaneously meet the following two conditions; namely, to maintain a high electric resistance over a wide temperature range and to have a large temperature coefficient of electric resistance at temperatures just below the aforesaid range. For instance, when a ceramic is used to sense the presence of a flame, it is required to keep a high electric resistance as long as flame exists, large or small, and to rapidly decrease its electric resistance upon loss of the flame. However, there has not been any PTC ceramic, heretofore, which satisfactorily meets both of the two conditions.

Therefore, an object of the present invention is to provide an improved PTC ceramic which simultaneously meets the aforesaid two conditions.

SUMMARY OF THE INVENTION

The inventors have found out that high electric resistance over a wide temperature range and a large temperature coefficient of resistance at temperatures just below the aforesaid range can be achieved by using a PTC ceramic which consists essentially of 100 parts by weight of four ingredients including
a. 1 mol of one barium titanate composition selected from the group consisting of barium titanate, barium titanate plus lead titanate, barium titanate plus strontium titanate, and barium titanate plus barium stannate,
b. 0.003 to 0.05 mol of titania,
c. 0.003 to 0.05 mol of alumina, and
d. 0.005 to 0.06 mol of silica;
0.05 to 0.3 part by weight of
e. at least one oxide selected from the group consisting of tantalum pentoxide and antimony pentoxide; and
0.005 to 0.03 part by weight of
f. at least one metal selected from the group consisting of manganese and copper.

In the above composition, titania constituting the aforesaid ingredient (b) is added to reduce the firing temperature of the PTC ceramic and to improve the stability thereof. If the amount of titania in the PTC ceramic is in short of 0.003 mol for 1 mol of the barium titanate composition, the desired improvement of the firing temperature and the stability cannot be achieved. The addition of titania in excess of 0.05 mol for 1 mol of the barium titanate composition tends to result in a small temperature coefficient of electric resistance of the PTC ceramic.

Alumina, which is the aforesaid ingredient (c), is added to reduce the firing temperature of the PTC ceramic and to provide a wide temperature range in which the electric resistance of the PTC ceramic is kept high. If the amount of alumina in the PTC ceramic is less than 0.003 mol for 1 mol of the barium titanate composition, the desired effect of providing a wide temperature range for high electric resistance cannot be achieved. The addition of alumina in excess of 0.05 mol for 1 mol of the barium titanate composition tends to result in a small temperature coefficient of resistance of the PTC ceramic.

The aforesaid ingredient (d), i.e., silica, is added to produce a large temperature coefficient of the resistance of the PTC ceramic and to provide a PTC ceramic which can withstand a high electric voltage. The desired effects cannot be achieved unless silica is added in excess of 0.005 mol for 1 mol of the barium titanate composition. On the other hand, the addition of more than 0.06 mol of silica for 1 mol of barium titanate composition tends to result in a small temperature coefficient of resistance and a low melting point of the PTC ceramic which may lead to ceramic fusion in the firing process.

The aforesaid ingredient (e), i.e., tantalum pentoxide and/or antimony pentoxide, is effective in improving the stability of the PTC ceramic, as long as its content in the ceramic is more than 0.05 part by weight. The addition of the ingredient (e) in excess of 0.3 part by weight tends to result in an excessively high resistance and to deteriorate the stability of the PTC ceramic.

The aforesaid ingredient (f), i.e., manganese and/or copper, is effective in increasing the magnitude of the temperature coefficient of the resistance of the ceramic, provided that it is added in excess of 0.005 part by weight. The ingredient (f) in excess of 0.03 part by weight tends to deteriorate the stability of the ceramic and to make the ceramic into an electrically insulating substance. Preferably, to make the ceramic, the ingredient (f) is added in the form of an aqueous solution of its sulphate or nitrate.

BRIEF DESCRIPTION OF THE DRAWINGS

FIG. 1 is a graph, illustrating the temperature-resistance characteristics of PTC ceramics, each lacking one of essential ingredients of the present invention;

FIGS. 2A to 2C are graphs, showing the temperature-resistance characteristics of PTC ceramics according to the present invention;

FIG. 3 is a graph, showing the temperature-resistance characteristics of PTC ceramics according to the present invention, which contain various compositions for the ingredient (a), respectively; and FIG. 4 is a graph, showing the temperature-resistance characteristics of conventional PTC ceramics.

DESCRIPTION OF THE PREFERRED EMBODIMENTS

Reference specimens R-1 to R-5 were prepared, each of which contained barium titanate (BaIiO$_3$) and four of five other indispensable ingredients of the ceramic of the present invention, and their resistances at different temperatures were measured. The results are shown in Table 1 and FIG. 1. The measurement of the resistances was carried out by securing ohmic electrodes on opposing surfaces of each PTC ceramic specimen and applying D.C. 1 volt across the electrodes.

The size of sample was 16 mm of diameter and 2.5 mm of thickness (thereafter measurement was carried out as the same manner).

Specimens No. 1 to No. 35 of the PTC ceramic according to the present invention were prepared, and their electric resistances were similarly measured. The results are shown in Table 2 and FIGS. 2A to 2C.

The method of producing the PTC ceramic according to the present invention will be explained with respect to Sample No. 2 in Table 2. $BaCO_3$, $TiO_2$, $Al_2O_3$, $SiO_2$, $Sb_2O_5$ and an aqueous solution of manganese sulphate were mixed so that the fired barium titanate ceramic would be composed of $BaTiO_3$, $TiO_2$, $Al_2O_3$, $SiO_2$, $Sb_2O_5$ and Mn in amounts as shown in Sample No. 2 in Table 2, and the resulting mixture was pulverized and mixed in a wet state by means of agate pebbles in a pot having a polyethylene lining, the resulting slurry was dried by means of a spray drier, granulated and press molded in a conventional manner, and the molded article was fired at 1,325° C for 2 hours to obtain the barium titanate ceramic.

As apparent from the comparison of Table 1 with Table 2 and the comparison of FIG. 1 with FIGS. 2A to 2C, in order to fulfill the object of the present invention, all of the aforesaid six ingredients (a) to (f) are essential. More particularly, with the ceramic of the present invention, the width of the temperature range for the maximum resistance $R_{max}$ to $0.1R_{max}$ is 150° to 208° Celsius while ensuring a temperature coefficient of electric resistance in terms of (resistance at 170° C)/(resistance at 120° C) above 10,600. With reference Specimens R-1 to R-5, the aforesaid temperature range width is generally less than 140° Celsius, and when that temperature range width is 240° Celsius, the aforesaid temperature coefficient is reduced to 700. In any case, none of the reference specimens R-1 to R-5 has both of the aforesaid wide temperature range for high electric resistance and the aforesaid high temperature coefficient of electric resistance.

As far as the embodiments of Table 2 are concerned, the present invention provides barium titanate ceramic which consists essentially of 100 parts by weight of four ingredients including
  a. 1 mol of barium titanate,
  b. 0.003 to 0.05 mol, preferably 0.01 to 0.03 mol, of titania,
  c. 0.003 to 0.05 mol, preferably 0.005 to 0.025 mol, of alumina, and
  d. 0.005 to 0.06 mol, preferably 0.01 to 0.04 mol, of silica;

0.05 to 0.3 part, preferably 0.1 to 0.2 part, by weight of
  e. at least one oxide selected from the group consisting of tantalum pentoxide and antimony pentoxide; and 0.005 to 0.03 part, preferably 0.01 to 0.02 part by weight of
  f. at least one metal selected from the group consisting of manganese and copper.

The barium titanate ceramic of the present invention is not restricted to the aforesaid composition. More particularly, the ingredient (a) of the PTC ceramic according to the present invention need not be pure barium titanate, but it can be one of the mixtures containing barium titanate, as will be described hereinafter. The inventors prepared Specimens No. 36 to No. 41, which are based on ingredients (a) made of barium titanate compositions, or mixtures containing barium titanate. The temperature-resistance characteristics of such Specimens were similarly determined. The results are shown in Table 3 and FIG. 3, together with the chemical compositions thereof.

For comparison, Specimens R-6 and R-7 were prepared, which contained conventional barium titanate compositions. Properties of such Specimens R-6 and R-7 were determined, and the results are shown in Table 4 and FIG. 4, together with the chemical compositions of the Specimens.

Table 1

| Sample No. | Ingredients | | | | | | Resistances (Ohms) at different temperatures (°C) | | | | | | | Rate of resistance variation (B/A) | Temperature range for top 10% resistance* (°C) | Curve No. in FIG. 1 |
|---|---|---|---|---|---|---|---|---|---|---|---|---|---|---|---|---|
| | (a) Barium titanate (BaTiO₃) | (b) Titania (TiO₂) | (c) Alumina (Al₂O₃) | (d) Silica (SiO₂) | (e) Antimony pentoxide (Sb₂O₅) | (f) Manganese (Mn) | 70 | (A) 120 | (B) 170 | 220 | 270 | 320 | 370 | | | |
| | Mol | | | | Weight parts (100 parts represent total weight of (a) to (d)) | | | | | | | | | | | |
| R-1 | 1 | — | 0.01 | 0.02 | 0.2 | 0.01 | $2.0\times10^2$ | $5.1\times10^2$ | $1.2\times10^6$ | $1.0\times10^6$ | — | — | — | 2,400 | 80 | 1 |
| R-2 | 1 | 0.02 | — | 0.02 | 0.2 | 0.01 | $8.5\times10$ | $1.4\times10^2$ | $1.22\times10^6$ | $3.0\times10^6$ | $2.3\times10^5$ | — | — | 8,700 | 100 | 2 |
| R-3 | 1 | 0.02 | 0.01 | — | 0.2 | 0.01 | $1.4\times10^2$ | $3.1\times10^2$ | $2.3\times10^6$ | $4.2\times10^6$ | $5.1\times10^5$ | — | — | 7,500 | 110 | 3 |
| R-4 | 1 | 0.02 | 0.01 | 0.02 | — | 0.01 | $4.0\times10$ | $9.5\times10$ | $8.9\times10^5$ | $8.3\times10^6$ | $4.1\times10^6$ | — | — | 9,400 | 140 | 4 |
| R-5 | 1 | 0.02 | 0.01 | 0.02 | 0.2 | — | $1.3\times10$ | $2.6\times10$ | $1.8\times10^4$ | $1.1\times10^5$ | $1.6\times10^5$ | $9.4\times10^4$ | $2.6\times10^4$ | 700 | >240 | 5 |

*In this temperature range, the resistance is between its maximum $R_{max}$ and $0.1 R_{max}$ Table 2

| Sample No. | (a) Barium Titanate (BaTiO₃) | (b) Titania (TiO₂) | (c) Alumina (Al₂O₃) Mol | (d) Silica (SiO₂) | (e) Antimony pentoxide (Sb₂O₅) | (e) Tantalum pentoxide (Ta₂O₅) | (f) Manganese (Mn) | (f) Copper (Cu) | 70 | (A) 120 | (B) 170 | 220 | 270 | 320 | 370 | Rate of resistance variation (B/A) | Temperature range for top 10% resistance* (°C) | Curve No. in FIGS. 2A to 2C |
|---|---|---|---|---|---|---|---|---|---|---|---|---|---|---|---|---|---|---|
| | | | | | | | | | | | | | | | | | | |
| 1 | 1 | 0.005 | | | | | | | $1.0\times10^2$ | $2.3\times10^2$ | $2.6\times10^6$ | $1.4\times10^7$ | $1.1\times10^7$ | $7.8\times10^5$ | — | 11,400 | 150 | 6 |
| 2 | 1 | 0.01 | | | | | | | 9.0 | $2.3\times10$ | $1.2\times10^4$ | $5.7\times10^6$ | $4.5\times10^7$ | $1.1\times10^4$ | — | 60,000 | 170 | 7 |
| 3 | 1 | 0.02 | 0.025 | 0.02 | 0.2 | — | 0.61 | — | 3.8 | 9.0 | $7.3\times10^3$ | $5.6\times10^4$ | $1.4\times10^7$ | $6.3\times10^6$ | — | 81,000 | 165 | 5 |
| 4 | 1 | 0.03 | | | | | | | 5.4 | $1.3\times10$ | $5.2\times10^3$ | $7.0\times10^6$ | $1.0\times10^7$ | $4.6\times10^6$ | — | 40,000 | 170 | 9 |
| 5 | 1 | 0.05 | | | | | | | $2.9\times10$ | $1.1\times10^2$ | $1.2\times10^2$ | $4.5\times10^5$ | $4.6\times10^6$ | $2.6\times10^6$ | — | 10,900 | 190 | 10 |
| 6 | 1 | | 0.003 | 0.02 | 0.2 | — | 0.01 | — | $7.1\times10$ | $2.0\times10^2$ | $2.6\times10^4$ | $1.4\times10^4$ | $1.0\times10^3$ | $1.7\times10^6$ | — | 13,000 | 150 | — |
| 7 | 1 | | 0.005 | 0.02 | 0.2 | — | 0.01 | — | $3.4\times10$ | $1.2\times10^2$ | $3.1\times10^4$ | $1.8\times10^4$ | $1.0\times10^7$ | $1.1\times10^4$ | — | 25,800 | 150 | — |
| 8 | 1 | 0.02 | 0.025 | 0.005 | 0.2 | — | 0.01 | — | 6.2 | $1.6\times10$ | $8.3\times10^7$ | $9.0\times10^4$ | $1.2\times10^7$ | $2.8\times10^4$ | — | 52,000 | 163 | — |
| 9 | 1 | 0.02 | 0.05 | 0.01 | | | | | 9.3 | $3.3\times10$ | $3.5\times10^5$ | $1.7\times10^7$ | $1.9\times10^4$ | $9.5\times10^5$ | $1.9\times10^5$ | 10,600 | 208 | — |
| 10 | 1 | | | | | | | | $2.9\times10$ | $1.2\times10^2$ | $3.8\times10^4$ | $1.3\times10^6$ | $9.6\times10^4$ | $1.0\times10^6$ | — | 31,700 | 153 | — |
| 11 | 1 | | | | | | | | 6.1 | $1.4\times10$ | $8.4\times10^5$ | $7.1\times10^4$ | $5.9\times10^4$ | $1.8\times10^6$ | — | 60,000 | 167 | — |
| 12 | 1 | 0.02 | 0.015 | 0.04 | 0.2 | — | 0.01 | — | 9.2 | $2.6\times10$ | $3.9\times10^6$ | $1.9\times10^6$ | $1.3\times10^6$ | $6.3\times10^5$ | $1.1\times10^5$ | 15,000 | 195 | — |
| 13 | | | | 0.06 | | | | | $1.2\times10$ | $4.4\times10$ | $4.9\times10^6$ | $1.9\times10^6$ | $1.1\times10^6$ | $5.0\times10^5$ | $2.2\times10^5$ | 11,300 | 202 | — |
| 14 | 1 | 0.02 | 0.015 | 0.02 | 0.05 | — | 0.01 | — | 8.6 | $2.2\times10$ | $2.6\times10^6$ | $1.9\times10^6$ | $4.0\times10^7$ | $2.1\times10^6$ | $2.6\times10^5$ | 11,800 | 192 | 11 |
| 15 | 1 | | | | 0.1 | | | | 5.1 | $1.1\times10^2$ | $7.6\times10^6$ | $7.4\times10^6$ | $1.0\times10^7$ | $4.6\times10^6$ | — | 69,000 | 177 | 12 |
| 16 | 1 | | | | 0.3 | | | | $1.8\times10$ | $7.2\times10^2$ | $1.7\times10^7$ | $1.9\times10^7$ | $1.6\times10^7$ | $2.8\times10^6$ | — | 23,600 | 153 | 13 |
| 17 | 1 | 0.02 | 0.015 | 0.02 | — | 0.05 | 0.01 | — | $1.1\times10$ | $3.2\times10$ | $3.5\times10^5$ | $2.4\times10^4$ | $5.4\times10^4$ | $2.5\times10^4$ | $3.4\times10^5$ | 10,900 | 185 | — |
| 18 | 1 | | | | | 0.1 | | | 7.3 | $2.8\times10$ | $6.6\times10^4$ | $3.9\times10^4$ | $6.5\times10^4$ | $3.8\times10^4$ | — | 23,600 | 180 | — |
| 19 | 1 | 0.62 | 0.015 | 0.02 | — | 0.2 | 0.01 | — | 5.6 | $1.5\times10$ | $7.5\times10^5$ | $6.4\times10^4$ | $9.9\times10^4$ | $5.0\times10^4$ | — | 50,000 | 170 | — |
| 20 | | | | | | 0.3 | | | $6.5\times10$ | $1.2\times10^2$ | $3.0\times10^4$ | $2.5\times10^4$ | $1.7\times10^5$ | $1.9\times10^4$ | — | 25,000 | 150 | — |
| 21 | 1 | 0.02 | 0.015 | 0.02 | 0.025 | 0.025 | 0.01 | — | $1.0\times10$ | $3.1\times10$ | $3.7\times10^5$ | $2.5\times10^5$ | $3.4\times10^4$ | $2.5\times10^4$ | — | 11,900 | 190 | — |
| 22 | | | | | 0.05 | 0.05 | | | 7.9 | $3.1\times10$ | $9.2\times10^3$ | $4.5\times10^6$ | $7.1\times10^4$ | $3.6\times10^4$ | $3.6\times10^5$ | 29,700 | 170 | — |
| 23 | 1 | 0.02 | 0.015 | 0.02 | 0.1 | 0.1 | 0.005 | — | 4.2 | 9.5 | $5.1\times10^4$ | $6.3\times10^4$ | $8.8\times10^4$ | $3.7\times10^4$ | — | 53,700 | 170 | — |
| 24 | | | | | 0.15 | 0.15 | 0.02 | | $2.7\times10$ | $4.2\times10^2$ | $8.5\times10^5$ | $1.4\times10^7$ | $1.1\times10^7$ | $2.3\times10^6$ | — | 20,200 | 155 | 14 |
| 25 | 1 | 0.02 | 0.015 | 0.02 | 0.2 | — | 0.005 | — | 4.0 | $1.1\times10^2$ | $1.1\times10^4$ | $4.8\times10^7$ | $5.5\times10^5$ | $3.0\times10^6$ | — | 10,000 | 200 | 15 |
| 26 | | | | | | | 0.02 | | $2.1\times10$ | $9.0\times10^2$ | $9.7\times10^4$ | $7.0\times10^4$ | $7.8\times10^7$ | $1.5\times10^7$ | — | 108,000 | 167 | 16 |
| 27 | | | | | | | 0.03 | | $6.0\times10^2$ | $1.2\times10^3$ | $3.7\times10^4$ | $3.7\times10^4$ | $2.8\times10^8$ | $2.9\times10^7$ | — | 30,700 | 150 | — |
| 28 | 1 | 0.02 | 0.015 | 0.02 | 0.2 | — | — | 0.005 | 3.7 | $1.0\times10$ | $1.2\times10^4$ | $4.7\times10^6$ | $5.4\times10^4$ | $1.9\times10^7$ | — | 12,000 | 185 | — |
| 29 | | | | | | | | 0.01 | 8.4 | $2.0\times10$ | $1.1\times10^4$ | $5.4\times10^6$ | $4.2\times10^6$ | $9.6\times10^5$ | — | 55,000 | 170 | — |
| 30 | 1 | 0.02 | 0.015 | 0.02 | 0.2 | — | — | 0.02 | $2.5\times10$ | $9.4\times10^4$ | $5.4\times10^7$ | $3.5\times10^7$ | $2.5\times10^7$ | $5.1\times10^4$ | — | 59,700 | 163 | — |
| 31 | | | | | | | | 0.03 | $7.1\times10^2$ | $1.4\times10^3$ | $2.2\times10^7$ | $2.5\times10^4$ | $1.4\times10^6$ | $2.4\times10^7$ | — | 15,700 | 150 | — |
| 32 | 1 | 0.02 | 0.015 | 0.02 | 0.2 | — | 0.0025 | 0.0025 | 6.0 | $1.6\times10$ | $2.2\times10^5$ | $1.0\times10^4$ | $8.5\times10^6$ | $2.7\times10^5$ | — | 13,800 | 152 | — |
| 33 | 1 | | | | | | 0.005 | 0.005 | $1.4\times10$ | $6.3\times10^3$ | $1.2\times10^4$ | $5.1\times10^4$ | $5.9\times10^4$ | $2.4\times10^4$ | — | 17,000 | 170 | — |
| 34 | 1 | 0.02 | 0.015 | 0.02 | 0.2 | — | 0.01 | 0.01 | $1.0\times10$ | $1.7\times10^7$ | $4.5\times10^4$ | $6.2\times10^7$ | $6.3\times10^7$ | $1.3\times10^7$ | — | 38,2000 | 160 | — |
| 35 | 1 | | | | | | 0.015 | 0.015 | $1.1\times10^1$ | $1.9\times10^1$ | $3.2\times10^7$ | $2.0\times10^4$ | $1.9\times10^6$ | $2.4\times10^7$ | — | 16,800 | 167 | — |

Weight parts (100 parts represent total weight of (a) to (d))

*In this temperature range, the resistance is between its maximum $D_{min}$ and $0.1R_{max}$.

Table 3

| Sample No. | Ingredients (Mol) | | | | | | | |
|---|---|---|---|---|---|---|---|---|
| | Barium titanate (BrHO₃) | (a) Lead titanate (SbTiO₃) | Strontium titanate (SrTiO₃) | Barium stannate (BaSnO₃) | (b) Titania (TiO₂) | (c) Alumina (Al₂O₃) | (d) Silica (SiO₂) | (e) Antimony pentoxide (Sb₂O₅) / (f) Manganese (Mn) Weight parts (100 parts represent total weight of (a) to (d)) |
| 36 | 0.9999 | 0.0001 | — | — | | | | |
| 37 | 0.65 | 0.35 | — | — | | | | |
| 34 | 0.9999 | — | 0.0001 | — | | | | |
| 35 | 0.6 | — | 0.4 | — | 0.02 | 0.015 | 0.02 | 0.2 / 0.01 |
| 40 | 0.9999 | — | — | 0.0001 | | | | |
| 41 | 0.65 | — | — | 0.15 | | | | |

| Sample No. | Resistances (Ohms) at different temperatures (° C) | | | | | | | | | | | | Rate of resistance variation (B/A) | Temperature range for top 10% resistance* (° C) | Curve No. in FIG. 5 |
|---|---|---|---|---|---|---|---|---|---|---|---|---|---|---|---|
| | −10 | 0 | 50 | 100 | 120 | 170 | 220 | 270 | 320 | 370 | 420 | 470 | 520 | | | |
| 36 | — | 7.1 | 4.5 | 5.6 | (A) 9.1 | (B) 7.2×10⁵ | 1.0×10⁷ | 1.4×10⁷ | 7.9×10⁶ | — | — | — | — | 79,000 | 170 | 17 |
| 37 | — | — | 6.0×10² | 3.5×10² | 2.8×10² | 1.0×10² (B) | 1.1×10² (A) | 1.3×10⁷ | 9.0×10⁵ | 1.2×10⁷ | 1.8×10⁷ | 7.5×10⁶ | 1.3×10⁶ | 6,9000 | 190 | 14 |
| 38 | — | 7.0 (A) | 4.5 (B) | 5.6 | 8.9 | 7.1×10⁵ | 1.0×10⁷ | 1.4×10⁷ | 7.8×10⁶ | — | — | — | — | 80,000 | 170 | 19 |
| 39 | 2.1×10² | 4.0×10² | 2.2×10⁶ | 1.2×10⁷ | 1.6×10⁷ | 1.9×10⁷ | 5.7×10⁴ | — | — | — | — | — | — | 5,500 | 193 | 20 |
| 40 | — | 7.1 (A) | 4.6 (B) | 5.7 | 9.0 | 7.2×10⁶ | 1.1×10⁷ | 1.4×10⁷ | 7.8×10⁶ | — | — | — | — | 80,000 | 170 | 21 |
| 41 | 3.0×10 | 1.1×10² | 6.0×10³ | 7.4×10⁶ | 1.1×10⁷ | 1.3×10⁷ | 4.4×10⁴ | — | — | — | — | — | — | 5,500 | 186 | 22 |

*In this temperature range, the resistance is between its maximum $R_{max}$ and $0.1R_{max}$.

Table 4

| Sample No. | Ingredients | Resistances (Ohms) at different temperatures (° C) | | | | | | | | Rate of resistance variation (B/A) | Temperature range for top 10% resistance* (° C) | Curve No. in FIG. 4 |
|---|---|---|---|---|---|---|---|---|---|---|---|---|
| | | 70 | (A) 120 | (B) 170 | 220 | 270 | 320 | 420 | | | | |
| R-6 | Barium titanate (BaTiO₃) : 1 mol<br>Manganese oxide (MnO₂) : 1.36 × 10⁻³ mol<br>Niobium pentoxide (Nb₂O₅) : 2.2 × 10⁻³ mol | 2.3 × 10² | 1.0 × 10⁴ | 1.5 × 10¹⁰ | 1.0 × 10⁸ | — | — | — | | 1,500,000 | 60 | 23 |
| R-7 | Barium lanthanum titanate (Ba₀.₉₉₇La₀.₀₀₃TiO₃) | 4.0 × 10 | 3.6 × 10³ | 2.0 × 10⁵ | 3.4 × 10⁵ | 1.4 × 10⁵ | 4.0 × 10⁴ | | | 56 | 180 | 24 |

*In this temperature range, the resistance is between its maximum $R_{max}$ and $0.1R_{max}$.

It is apparent from the foregoing that the PTC ceramic according to the present invention has not only a large electric resistance over a wide temperature range, but also a large temperature coefficient of electric resistance at temperatures just below the aforesaid range.

What is claimed is:

1. A ceramic having a positive temperature coefficient of electric resistance, consisting essentially of:
   100 parts by weight of four ingredients including
   a. 1 mol of one barium titanate composition which is selected from the group consisting of barium titanate, 0.0001 to 0.35 mol of lead titanate and the remainder of barium titanate, 0.0001 to 0.4 mol of strontium titanate and the remainder of barium titanate, and 0.0001 to 0.15 mol of barium stannate and the remainder of barium titanate,
   b. 0.003 to 0.05 mol of titania,
   c. 0.003 to 0.05 mol of alumina, and
   d. 0.005 to 0.06 mol of silica;
   0.05 to 0.3 part by weight of at least one oxide selected from the group consisting of tantalum pentoxide and antimony pentoxide based on the preceding 100 parts by weight of ingredients (a) to (d); and
   0.005 to 0.03 part by weight of at least one metal selected from the group consisting of manganese and copper based on the preceding 100 parts by weight of ingredients (a) to (d).

2. The ceramic according to claim 1, wherein said barium titanate composition is 0.0001 to 0.35 mol of lead titanate and the remainder of barium titanate.

3. The ceramic according to claim 1, wherein the quantity of said titania is 0.01 to 0.03 mol.

4. The ceramic according to claim 1, wherein the quantity of said alumina is 0.005 to 0.025 mol.

5. The ceramic according to claim 1, wherein the quantity of said silica is 0.01 to 0.04 mol.

6. The ceramic according to claim 1, wherein the quantity of said oxide is 0.1 to 0.2 part by weight.

7. The ceramic according to claim 1, wherein the quantity of said metal is 0.01 to 0.02 part by weight.

8. A ceramic having a positive temperature coefficient of electric resistance, consisting essentially of:
   100 parts by weight of four ingredients including
   a. 1 mol of one barium titanate composition which is selected from the group consisting of barium titanate, 0.0001 to 0.35 mol of lead titanate and the remainder of barium titanate, 0.0001 to 0.4 mol of strontium titanate and the remainder of barium titanate, and 0.001 to 0.15 mol of barium stannate and the remainder of barium titanate,
   b. 0.01 to 0.03 mol of titania,
   c. 0.005 to 0.25 mol of alumina, and
   d. 0.01 to 0.04 mol of silica;
   0.1 to 0.2 part by weight of at least one oxide selected from the group consisting of tantalum pentoxide and antimony pentoxide based on the preceding 100 parts by weight of ingredients (a) to (d); and
   0.01 to 0.02 part by weight of at least one metal selected from the group consisting of manganese and copper based on the preceding 100 parts by weight of ingredients (a) to (d).

9. The ceramic according to claim 8, wherein said barium titanate composition is barium titanate.

10. The ceramic according to claim 8, wherein said barium titanate composition is 0.0001 to 0.35 mol of lead titanate and the remainder of barium titanate.

11. The ceramic according to claim 8, wherein said oxide is antimony pentoxide.

12. The ceramic according to claim 8, wherein said metal is manganese.

* * * * *